R. M. ARNOLD.
DOUBLE REACH VEHICLE GEAR.
APPLICATION FILED OCT. 3, 1912.

1,066,693.

Patented July 8, 1913.

UNITED STATES PATENT OFFICE.

ROY M. ARNOLD, OF DANVILLE, KENTUCKY.

DOUBLE-REACH VEHICLE-GEAR.

1,066,693.  Specification of Letters Patent.  Patented July 8, 1913.

Application filed October 3, 1912. Serial No. 723,818.

*To all whom it may concern:*

Be it known that I, ROY M. ARNOLD, a citizen of the United States of America, and a resident of Danville, in the State of Kentucky, have invented a new and useful Improvement in Double-Reach Vehicle-Gears, of which the following is a specification.

This invention relates to running gear mainly of wood for wheeled road vehicles, especially buggies; and it consists in a continuous inside reach-iron by which the double-reach is reinforced, and in certain novel combinations of parts, the whole embodied in an improved double-reach gear, as hereinafter particularly described and claimed.

The leading objects of the invention are to render a double-reach vehicle gear "solid" as if it was made in one piece; to prevent the breaking of the reach just behind the fifth wheel; to prevent the gear from getting sprung out of line, and to prevent the customary clips from slipping on the rear axle in case they should come loose. These and other advantages of the improved construction will be appreciated by those skilled in the art.

A sheet of drawings accompanies this specification as part thereof.

Figure 1:
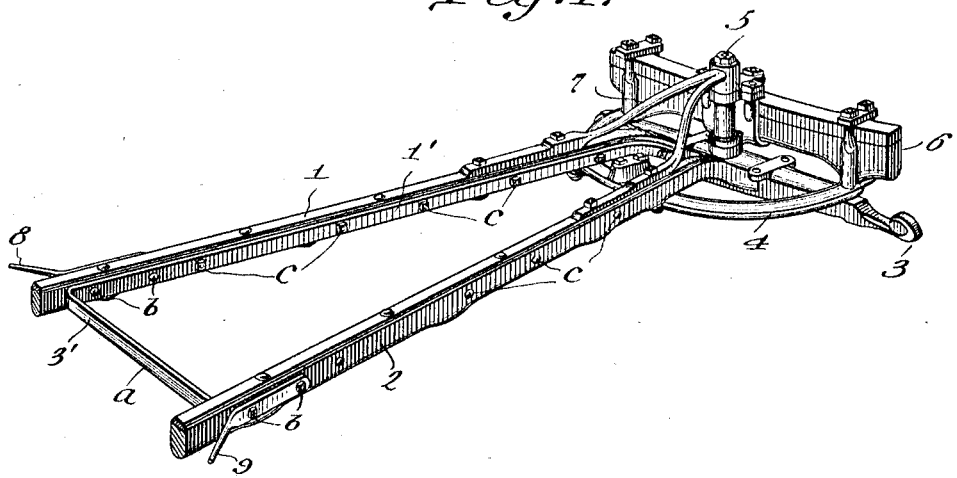
Figure 2:
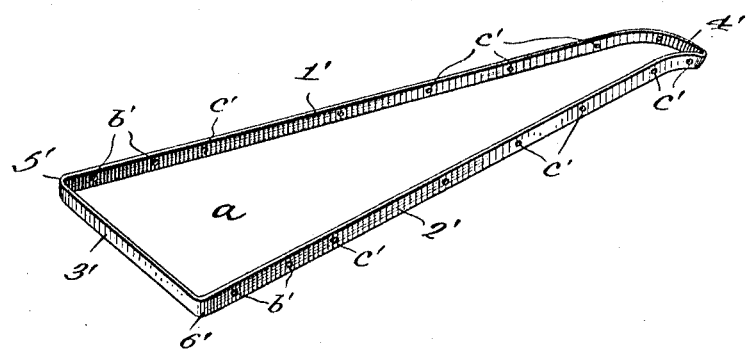

Figure 1 is a perspective bottom view of a sufficient portion of an improved double-reach vehicle gear to illustrate the present invention; Fig. 2 is a perspective view of its inside reach iron detached.

Like reference characters refer to like parts in both figures.

The two members of a double reach, suitably spaced apart, are represented in Fig. 1 at 1 and 2; a spring bolster to which their front ends are rigidly bolted is shown at 3; a fifth wheel to the upper member of which said bolster is bolted is shown at 4; and a king bolt at 5; a front axle to which the lower member of the fifth wheel and the socket member of the king bolt are clipped is represented at 6; a bifurcated brace, for the lower end of the king bolt 5, bolted to the two reach members 1 and 2, is shown at 7; and a pair of axle stays to connect the reach with the rear axle are represented at 8 and 9. All these parts may be of any suitable known or improved construction. For the objects hereinbefore stated, I combine therewith and especially with said double reach an inside reach iron, $a$, shown in position by Fig. 1 and detached by Fig. 2, and bolts $b$ and $c$, Fig. 1, fixedly fastening the same in place. This reach iron has long side members 1' and 2', and a relatively short cross-member 3', Fig. 2, all of which are straight, with curved connections 4', 5', 6'; the whole being made in one continuous piece of suitable metal, and extending rearward from close behind the spring bolster 3 along the two reach members 1 and 2 to the points where the axle stays 8 and 9 are bolted to the outside of the reach; taking the two bolts $b$ which attach the stay iron at each of these points and crossing by its portion 3' behind the same. A sufficient number of special bolts $c$ fitted thereto extend through bolt holes in the reach members 1 and 2 and the side portions 1' and 2' of the reach iron, the latter being provided with corresponding bolt holes as shown at $b'$ and $c'$ in Fig. 2. Provision is thus made for tightly attaching said side portions of the inside reach iron to the reach members 1 and 2, inside, at practically all points. The whole of the improved gear may thus be rendered as solid as if it was made in one piece; and a buggy or like road vehicle provided with the same is rendered strong and easy riding.

Having thus described said improvement, I claim as my invention, and desire to patent under this specification:

1. In a double-reach gear for a wheeled vehicle, an inside reach iron constructed in one continuous piece, having long side portions and a cross portion, all of which are straight, connected by short curved portions.

2. An improved double-reach gear having, in combination longitudinal reach members suitably spaced apart and rigidly connected at their front ends to a spring bolster, rear-axle braces rigidly attached outside to the respective reach members, an inside reach iron having side portions, a cross portion and connecting portions, and constructed and arranged to extend rearward from close behind said bolster and to cross behind the points at which said rear-axle braces are attached to the reach, and means for attaching said side portions of said inside reach iron to said reach members, substantially as hereinbefore specified.

3. An improved double-reach gear having, in combination, longitudinal reach members suitably spaced apart and rigidly connected at their front ends to a spring bolster, rear axle braces rigidly attached outside to the respective reach members, an inside reach iron having side portions, a cross portion and connecting portions in one continuous piece, constructed and arranged to extend rearward from close behind said bolster and to cross from side to side behind the points at which said rear-axle braces are attached to the reach, said reach members and said side portions of the inside reach iron being provided with bolt holes, and bolts, fitted to said holes, adapted to tightly attach said side portions to said reach members, inside, substantially as hereinbefore specified.

ROY M. ARNOLD.

Witnesses:
MILTON M. DURHAM,
EUGENE W. COOK.

Copies of this patent may be obtained for five cents each, by addressing the "Commissioner of Patents, Washington, D. C."